United States Patent [19]

Patel

[11] Patent Number: 4,633,113
[45] Date of Patent: Dec. 30, 1986

[54] SIDE PLATE CONSTRUCTION FOR PERMANENT MAGNET ROTOR

[75] Inventor: Navinchandra R. Patel, Rockford, Ill.

[73] Assignee: Sundstrand Corporation, Rockford, Ill.

[21] Appl. No.: 788,163

[22] Filed: Oct. 16, 1985

[51] Int. Cl.⁴ .............................................. H02K 21/14
[52] U.S. Cl. ..................................... 310/156; 310/43
[58] Field of Search ................... 310/43, 45, 112, 113, 310/156, 42, 261

[56] References Cited

U.S. PATENT DOCUMENTS

| | | |
|---|---|---|
| 2,873,395 | 2/1959 | Kober . |
| 3,151,261 | 9/1964 | Lee ..................................... 310/112 |
| 3,169,203 | 2/1965 | Lavin et al. ......................... 310/156 |
| 3,411,059 | 11/1968 | Kaiwa . |
| 3,445,700 | 5/1969 | Prange et al. . |
| 3,688,137 | 8/1972 | Filhol ................................... 310/43 |
| 3,707,638 | 12/1972 | Nallen . |
| 4,433,261 | 2/1984 | Nashiki et al. ...................... 310/156 |

FOREIGN PATENT DOCUMENTS

| | | | |
|---|---|---|---|
| 1942855 | 8/1973 | Fed. Rep. of Germany ...... | 310/156 |
| 2440171 | 2/1975 | Fed. Rep. of Germany ........ | 310/43 |

Primary Examiner—Patrick R. Salce
Assistant Examiner—D. L. Rebsch
Attorney, Agent, or Firm—Wood, Dalton, Phillips, Mason, & Rowe

[57] ABSTRACT

Loose or frayed fibers at the axial end of a fibrous wrap about the periphery of rotor hub mounting permanent magnets are avoided by placing steps between first and second diametral sections in side plates sandwiching the magnets, with the wrap preventing radial displacement of the magnets and the side plates preventing axial displacement.

7 Claims, 5 Drawing Figures

SIDE PLATE CONSTRUCTION FOR PERMANENT MAGNET ROTOR

FIELD OF THE INVENTION

This invention relates to permanent magnet rotors for use in dynamo electric machines, and more particularly, to such a rotor wherein permanent magnets are retained on a rotor hub or shaft against axial displacement by side plates and against radial displacement by non-magnetic fiber winding.

BACKGROUND OF THE INVENTION

Permanent magnet rotors are frequently used in dynamo electric machines such as motors and generators. Permanent magnets are secured to a rotor hub or shaft by any of a variety of means and care must be taken to assure that such securement prevents the magnets from moving either axially or radially. If axial movement is permitted, one or more magnets may not properly align with an armature, with the consequence that machine efficiency diminishes. If radial movement occurs, the probability of interfering contact between the rotor and the stator, and the resulting frictional drag and/or damage to machine parts, come into existence.

As may be expected, securement of magnets increasingly becomes a problem with increased rotor speeds due to the increasing forces tending to cause magnet movement, particularly in the radial direction, with the increasing centrifugal force accompanying increasing rotational speeds. Thus, in many instances where there are relatively high speeds, and permanent magnet rotors are required, securement of the magnets against both axial and radial displacement is accomplished by sandwiching the magnets between side plates which prevent axial displacement and by winding a fibrous material such as carbon fiber about the peripheries of the side plates and the magnets to provide radial retention. An example of this approach is found in U.S. Pat. No. 4,433,261 issued Feb. 21, 1984 to Nashiki et al. In addition to the foregoing general construction, Nashiki takes steps to prevent axial displacement of the wound fiber with relation to the side plates, and thus, the magnets. In particular, each of the side plates used by Nashiki et al is provided with peripheral, radially outwardly opening groove which also receives some of the fiber during the winding process. The fiber, after being wound on the rotor assembly, is secured with some sort of a setable resin and thus the fiber and resin combination become solidified within the peripheral grooves in the side plates. Because the resin impregnated fibrous body becomes solid, axial displacement of the fiber is obstensibly prevented.

However, this approach does not assure that fiber windings axially outwardly of the peripheral grooves in the side plates are positively retained against axial displacement. Loose fibers, not captured by the resin matrix, may exist at the ends of the fiber winding structure as a result of the application of insufficient resin in such locations. Even where sufficient resin is applied, the ends of the fiber windings define corners which, when the rotor is improperly handled, may become frayed, thereby loosening fibers from the fiber matrix.

If during operation of a machine in which the rotor is installed, the fibers become loose, they may impede proper operation of the machine by gumming up bearings or partially or wholly obstructing fluid flow paths. Furthermore, the discontinuities in the cylindrical surface of the rotor provided by such loose fibers contribute to windage losses.

Another difficulty encountered with rotors of the type disclosed by Nashiki et al reside in the difficulty in achieving a balance about the intended rotational axis of the rotor. When balance cannot be achieved, operation of the machine containing the rotor will result in the generation of vibration which can deleteriously affect the life of bearings and other machine components.

The present invention is directed to overcoming one or more of the above problems.

SUMMARY OF THE INVENTION

It is the principal object of the invention to provide a new and improved permanent magnet rotor assembly and the method of making the same. More specifically, it is an object of the invention to provide a new and improved permanent magnet rotor assembly and method of making the same which provide for the capturing of magnets to prevent their displacement in the axial or radial direction by means including a fibrous winding which is devoid of loose or potentially loose fibers at the ends of the windings and which is constructed so as to avoid damage to ends of the fibrous windings due to mishandling. It is also an object of the invention to provide such a permanent magnet rotor assembly wherein dynamic balancing of the rotor in two planes is easily attained.

According to one facet of the invention, there is provided a permanent magnet rotor for use in a dynamo electric machine which includes a rotor hub defining an intended axis of rotation. A plurality of circumferentially spaced magnets are disposed in the hub and filler material is located between adjacent ones of the magnets. Axially spaced, opposed side plates are located on the hub to sandwich the magnets and the filler material. Each side plate has a stepped periphery including an axially inner, generally cylindrical surface of substantially the same diameter as the hub with the magnets and filler material in place and an axially outer, generally cylindrical surface of a greater diameter to thereby define a radially outwardly opening annular recess. A generally cylindrical body of cured fibrous material is disposed in such recess and has an outer diameter equal to the greater diameter mentioned above.

As a consequence of this construction, the ends of the cylindrical body of cured fibrous material are protected by the side plates against damage during mishandling and all fiber windings at such ends are axially retained by abuttment with the side plates at the step formed therein.

In the preferred embodiment, the cured fibrous material is circumferentially wrapped carbon fiber disposed in an epoxy resin matrix.

In order to minimize the weight of the rotor, and hence the inertia of the rotor assembly, the invention contemplates the filler material be a matrix of microballoons and a cured resin.

The invention further contemplates that a surface of at least one of the side plates opposite the magnets is concave to define an annular ledge adjacent the periphery of the side plate from which material forming the side plate may be removed to balance the rotor.

According to another facet of the invention, there is provided a method of fabricating a permanent magnet rotor for use in a dynamo electric machine which includes the steps of:

(a) providing a rotor hub having an axis, (b) affixing magnets to the hub at circumferentially spaced locations, (c) locating filler material between the magnets, (d) applying axially spaced side plates to the hub to sandwich the magnets and the filler material therebetween such that an annular, radially outwardly opening recess exists between the remote surfaces of the side plates, (e) circumferentially winding a fiber and a curable resin about the structure resulting from step (d), both within and to each side of the recess until the recess is at least completely filled, (f) curing the resin, and (g) removing all fiber and resin radially and/or axially outwardly of the mouth of the recess to provide a cylindrical periphery for the rotor.

In a highly preferred embodiment, the side plates employed in such method each have first and second diametral sections with the first diametral section and the radially outer surface of the magnets and the filler material defining the bottom of the recess. The second diametral sections of the end of the side plates define oppose sides of the recess and step (g) is performed by removing all fiber and cured resin (i) axially outwardly of the first diametral section and (ii) radially outwardly of the second diametral section.

A highly preferred embodiment of the method contemplates that the magnets have radially outer surfaces defining sections of a cylinder and step (c) includes disposing some of the filler material radially outwardly of such cylinder. Step (c) is succeeded by, and step (d) is preceded by the step of removing the filler material radially outwardly of the cylinder so that the radially outer surface of the filler material defines other sections of such cylinder.

A highly preferred embodiment also contemplates that step (g) of the method be followed by the steps of applying a thin layer of curable resin to the cylindrical periphery and thereafter curing such thin layer. Subsequently, the rotor is dynamically balanced by removing material from at least one of the side plates axially oppositely of the magnets and near the periphery of the side plate or plates.

Other objects and advantages will become apparent from the following specification taken in connection with the accompanying drawings.

DESCRIPTION OF THE PREFERRED EMBODIMENT

Figure 1:
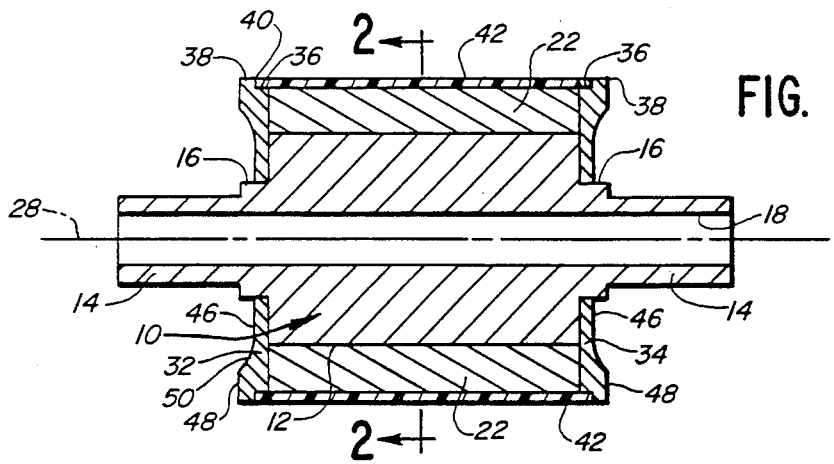
FIG. 1 is a sectional view of a permanent magnet rotor assembly made according to the invention.
Figure 2:
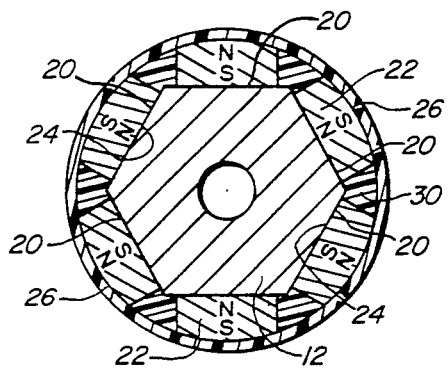
FIG. 2 is a sectional view of the rotor assembly taken approximately along the line 2—2 in FIG. 1.

An exemplary embodiment of a permanent magnet rotor assembly made according to the invention is illustrated in FIGS. 1 and 2, and will be described with reference thereto. While the same is illustrated (in FIG. 2) as being of the radial pole variety, it is to be understood that for the most part, the features of the invention are applicable to tangential pole rotors as well, and no limitation to one form or the other is intended except as set forth in the appended claims.

With reference to FIG. 1, the rotor includes a rotor hub, generally designated 10, which in turn is made up of an enlarged, central section 12, flanked by oppositely directed, integral stub shafts 14. Intermediate the central section 12 and each stub shaft 14 is a step 16.

The rotor hub 10 may have a hollow central cylindrical bore 18 for weight reduction purposes or for the flow of a coolant if desired.

As seen in FIG. 2, the central section 12 is hexagonal in shape, having a periphery defined by six flats 20 of equal angular length. Permanent magnets 22, having one flat polar surface 24, are abutted against and adhered to respective ones of the flats 20 by any suitable adhesive (not shown).

The surface of 26 opposite the surface 24 of each magnet 22, is formed of a section of a cylinder whose center is co-extensive with the rotational axis of the rotor, such rotational axis being illustrated by dotted line 28 in FIG. 1.

As illustrated in FIG. 2, the magnets 22 are arranged to provide a radial pole rotor and have the polar arrangements illustrated. In such a case, the rotor hub central portion 12 will be formed of a magnetic material. However, as alluded to previously, the magnets 22 could be disposed to provide a tangential pole rotor, in which case, the central section 12 would be formed of non-magnetic material.

Disposed between adjacent magnets 22 are bodies 30 of filler material. Where the rotor is a radial pole rotor, the filler material 30 is made of non-magnetic material. In a preferred embodiment, to minimize the weight of the rotor assembly, the filler material 30 is formed by a matrix of microballoons in epoxy resin. Both the microballoons and the epoxy resin should be capable of withstanding relatively high temperatures.

Returning to FIG. 1, the assemblage of magnets 22 and filler material 30 on the central section 12 is sandwiched between opposed symmetrical side plates 32 and 34. Since the side plate 34 is a mirror image of the side plate 32, only the latter will be described. It will be observed that both of the side plates 32 and 34 are disposed on respective one of the steps 16 of the rotor hub 10 and may be secured in such location by force-fitting, shrink-fitting, adhesive, or combinations thereof.

As seen in FIG. 1, the side plate 32 has a first diametral surface 36 which is of the same diameter as the cylinder defined by the surfaces 26 of the magnets 22. Axially outwardly of the first diametral surface 36 is a second diametral surface 38 of somewhat greater diameter. Thus, a step 40 exists between the diametral sections 36 and 38.

As a consequence of this construction, an elongated, shallow, radially outwardly opening, annular recess about the rotor is formed. Such recess has its bottom defined by the radially outer cylindrical surfaces 26 of the magnets 22 and the filler material 30 along with the diametral sections 36 on the side plates 32 and 34. The sides of the recess are defined by the steps 40 of the side plates 32 and 34 and the mouth of the recess is defined by the dimetral sections 38 of the side plates 32 and 34.

Within the recess thus defined, is a body 42 of cured fibrous material. The body 42 completely fills the recess and thus is cylindrical in nature, having an outer diameter equal to the diameter of the second diametral section 38 on the side plates 32 and 34.

In the preferred embodiment, the body 42 is formed by winding a fiber, such as carbon fiber, in a curable resin such as epoxy resin circumferentially about the rotor structure. The manner of winding will be described in greater detail hereinafter.

As a consequence of the foregoing construction, it will be seen that fibers at opposite axial ends of the body 42 are abutted against the steps 40 and the side plates 32 and 34, and prevented from axial displacement thereby. As a consequence, there will be no loose fibers in such vacinity, as can be the case in prior art constructions, to create difficulties during machine operations.

It will also be seen that the opposite axial ends of the body 42 are protected against mishandling damage by the second diametral sections 38 of the end plates 32 and 34.

The end plates 32 and 34 may be formed of any suitable non-magnetic material, but it is desirable that the same be such as to be selectively machined away for balancing purposes. In this connection, the side of each of the side plates 32 and 34 opposite of the magnets 22 includes an annular recess or concave portion 46, which in turn defines an annular lip 48 near the periphery of the respective side plate 32 and 34. Generally speaking, the bottom of the recess 46 will be planar and will merge into the lip 48 at a relatively radially outwardly located curved section 50.

The rotor thus formed may be easily balanced using conventional two-plane balancing equipment to the extent required, the material of which the side plates 32 and 34 is formed, may be removed both in the axial direction and in the radial direction at the curved sections 50 of each recess 46 as by machining.

Figure 3:
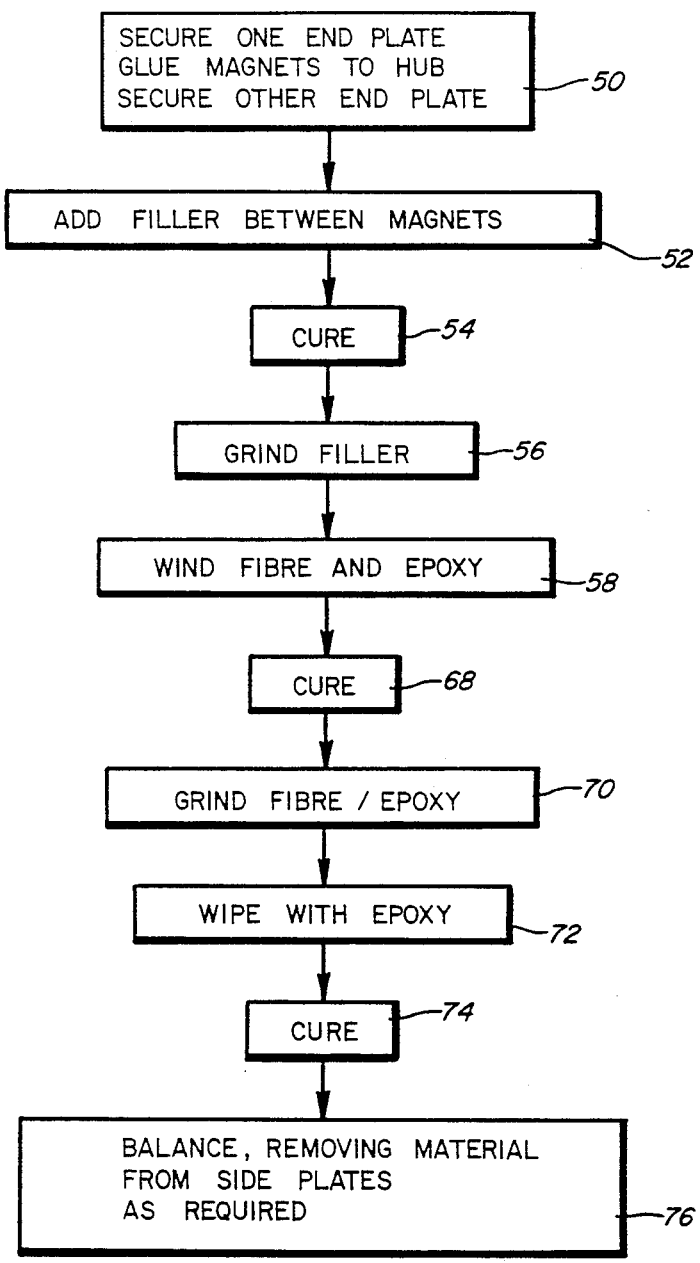
FIG. 3 is a block diagram illustrating a method of making a rotor according to the invention.

A method of assembling a rotor made according to the invention, is summarized in FIG. 3. As illustrated in block form therein, a first step 50 includes securing the end plate 34 on the step 16 of the rotor 10, adhering the magnets 22 to the central section 12 of the hub and securing the remaining end plate 32 on the associated step 16 on the rotor 10.

The second step, as shown at block 52, is to provide the filler material 30 between the magnets 22. Where the rotor is a radial pole rotor, this step involves the placing of an uncured mixture of microballoons and epoxy in excess between the magnets 22. The excess should be such that the filler material extends radially outwardly of the cylinder defined by the surfaces 26 of the magnets.

Where the rotor is a tangential pole rotor, magnetic material is used and may be pre-formed.

To the extent that a curable resin is employed in the step shown at block 52, it is followed by a step shown in block 54 of curing the resin.

Thereafter, as shown in block 56, the excess filler material is ground off of the rotor assembly such that the radially outer surface of the filler material 30 comprises other sections of the same cylinder defined by the cylindrical surfaces 26 of the magnets 22.

The step of grinding the filler material is followed by circumferentially winding the fiber with a curable resin such as epoxy, circumferentially about the rotor assembly. This step is illustrated schematically at block 58 and in greater detail in FIG. 4. In particular, the fiber-epoxy material that will ultimately form the body 42 is illustrated at 60 and it will be seen that it is placed about the rotor to build up, along the entire length of the rotor, a diameter somewhat greater than the diameter of the second diametral sections 38 of the side plates 32 and 34.

Figure 4:
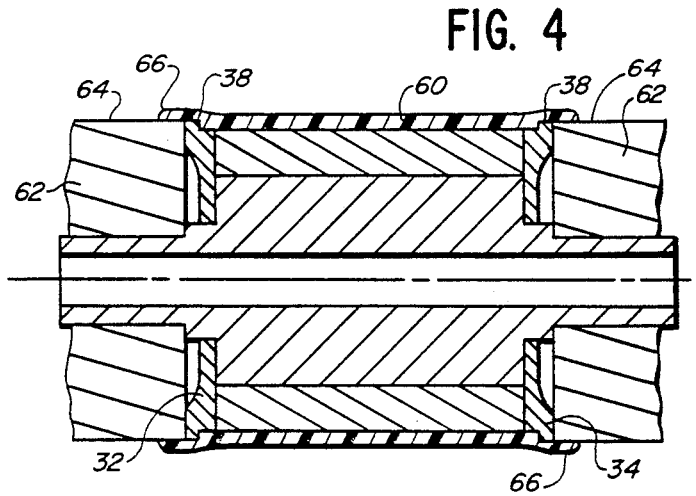
FIG. 4 is a view similar to FIG. 1, but showing the rotor at an intermediate point in its assembly.

FIG. 4 also illustrates that opposed fixtures 62 having cylindrical exterior surfaces 64 of a diameter equal to that of the second diametrical sections 38 of the side plates 32 and 34 may be abutted against respective side plates 32 and 34 and the fiber-epoxy wound thereon as shown at 66 to a location axially outwardly of both of the side plates 32 and 34.

Once the fiber-epoxy material has been wound on the assemblage of the rotor and the fixtures 62, the material may be subjected to a curing step shown at block 68 in FIG. 3.

The fiber-epoxy mixture, once cured, is then ground, as shown at block 70, down to the diameter of the second diametral sections 38 to thereby provide the body 42 of cured fibrous materials in the recess previously described and the fixtures 62 removed. This, of course, results in firm axial support of the ends of the body 42 as noted previously.

In the event the grinding process may have created mild imperfections in the fiber-epoxy matrix, or uncovered epoxy voids therein, the step of grinding may be followed by the step of lightly wiping the exterior of the rotor with an epoxy resin as shown at block 72 in FIG. 3. This light wipe of resin is then cured as shown at block 74.

Thereafter, with the forms 62 removed, the rotor may be placed in a conventional, two-plane balancing machine and rotated to achieve dynamic balancing. Machine indications will designate the angular location and the amount of material to be removed from each of the side plates 32 and 34 to achieve balance and this final sequence of steps is shown at block 76 in FIG. 3.

Figure 5:
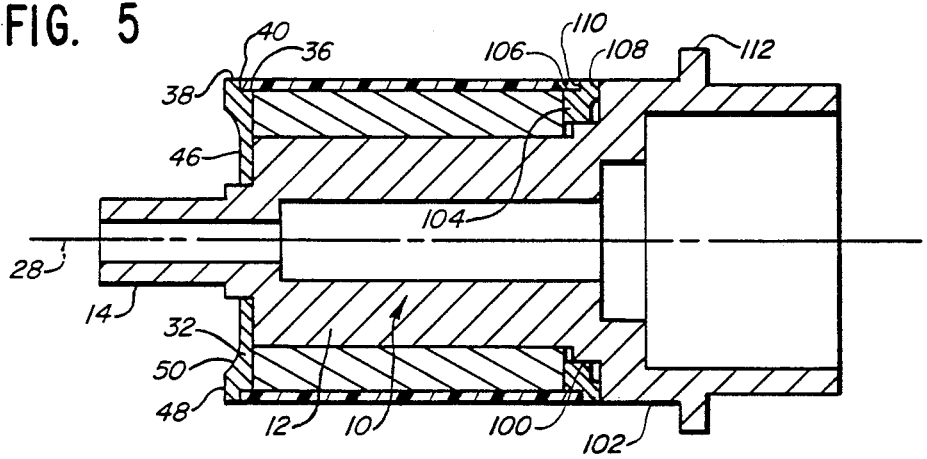
FIG. 5 is a view similar to FIG. 1, but of a modified embodiment of the invention.

FIG. 5 illustrates an alternative embodiment of the rotor assembly. Where similar or identical parts are employed, like reference numerals are given and will not be redescribed in the interest in brevity.

The embodiment in FIG. 5 differs from that shown in FIG. 1 principally in that one end of the rotor hub 10 eliminates a step 16 and a stub shaft 18 in favor of an enlarged diameter step 100 intermediate a cylindrical section 102 of the same diameter as the second diametral section 38 on the side plate 32.

The side plate 34 is dispensed with in favor of a ring-like side plate 104 located on the step 100. The side plate 104 serves the same function as the side plate 34 and to this end, has a first diametral section 106 corresponding to the diametral section 36 and a second diametral section 108 corresponding to the diametral section 38. The second diametral section 108 is of the same outer diameter as the cylindrical section 102 of the rotor hub 10.

A step 110 between the diametral sections 106 and 108 serves the same function as the step 40.

In fabricating the embodiment illustrated in FIG. 5, the right hand form 62 shown in FIG. 4 may be eliminated, with the cylindrical section 10 of the rotor hub 10 serving the same function in terms of receiving an axially outer part of the fiber-epoxy material during winding.

From the foregoing, it will be appreciated that a permanent magnet rotor assembly made according to the invention eliminates difficulties heretofore encountered in such rotor assemblies utilizing circumferential fibrous wraps by eliminating loose or frayed fibers at the axial end of the fibrous wrap. Furthermore, a rotor made according to the invention is easily balanced by the simple removal of material at the concave surfaces of the side plates 32 and 34. Where the embodiment shown in FIG. 5 is being employed, material removal on the right hand side of the rotor may be performed on a radially outwardly extending, peripheral flange 112.

I claim:

1. A permanent magnet rotor for use in a dynamo electric machine comprising:
    a rotor hub defining an intended axis of rotation;
    a plurality of circumferentially spaced magnets on said hub;
    filler material disposed between adjacent ones of said magnets;
    axially spaced opposed side plates on said hub sandwiching said magnets and said filler material, each said side plate having a stepped periphery including an axially inner, generally cylindrical surface of substantially the same diameter as the hub with the magnets and filler material in place and an axially outer, generally cylindrical surface of a greater diameter than said same diameter to define a radially outward opening annular recess; and
    a generally cylindrical body of cured fibrous material in said recess and having an outer diameter equal to said greater diameter.

2. The permanent magnet rotor of claim 1 wherein said cured fibrous material is circumferentially wrapped carbon fiber in an epoxy resin.

3. The permanent magnet rotor of claim 1 wherein said filler material is non-magnetic material and said rotor is a radial pole rotor.

4. The permanent magnet rotor of claim 1 wherein said filler material is a matrix of microballoons and a cured resin.

5. The permanent magnet rotor of claim 1 wherein one of said side plates is abutted against a step in a large diameter portion of said hub and said large diameter is equal to said greater diameter.

6. The permanent magnet rotor of claim 1 wherein a surface of at least one of said side plates opposite said magnets is concave to define an annular ledge adjacent its periphery from which material forming the side plate may be removed to balance said rotor.

7. A permanent magnet rotor for use in a dynamo electric machine comprising:
    a rotor hub defining an intended axis of rotation;
    a plurality of circumferentially spaced magnets on said hub;
    filler material disposed between adjacent ones of said magnets;
    axially spaced, opposed side plates secured on said hub and sandwiching said magnets and said filler material;
    at least one of said side plates having an axially outer concave surface to define an annular ledge from which material from which the side plate is formed may be removed to balance the rotor about said axis;
    a generally cylindrical body of cured fibrous material surrounding said magnets and said filler material;
    a radially outwardly opening annular recess defined by said side plates; and
    a body of circumferentially wrapped fiber in a cured resin disposed in said recess.

* * * * *